United States Patent [19]

Tokuda

[11] Patent Number: 4,937,614
[45] Date of Patent: Jun. 26, 1990

[54] METHOD OF AND APPARATUS FOR MAKING SCRATCH-FREE PHOTOGRAPHIC PRINTS

[75] Inventor: Kanji Tokuda, Kanagawa, Japan

[73] Assignee: Fuji Photo Film Co., Ltd., Kanagawa, Japan

[21] Appl. No.: 356,109

[22] Filed: May 24, 1989

[30] Foreign Application Priority Data

May 27, 1988 [JP] Japan .................. 63-129930

[51] Int. Cl.⁵ .................. G03B 27/54; G03B 27/32
[52] U.S. Cl. .................. 355/30; 355/71; 355/77
[58] Field of Search .................. 350/3.76; 355/30, 67, 355/71, 77

[56] References Cited

U.S. PATENT DOCUMENTS 4,834,476 5/1989 Benton .................. 350/3.76

Primary Examiner—Richard A. Wintercorn
Attorney, Agent, or Firm—Sughrue, Mion, Zinn, Macpeak & Seas

[57] ABSTRACT

A photographic printer for making prints from a transparent original film has a light source for illuminating the transparent original film and a printing lens for focusing light passing through the transparent original film onto photographic paper to create a latent image of the transparent original film. An anisotropic diffusing lens is disposed between the transparent original and the light source for diffusing light only in one direction, perpendicular to a lengthwise direction in which the transparent original film extends, to prevent scratches in the film from causing defects in the prints.

13 Claims, 3 Drawing Sheets

METHOD OF AND APPARATUS FOR MAKING SCRATCH-FREE PHOTOGRAPHIC PRINTS

BACKGROUND OF THE INVENTION

The present invention relates to a photographic printer for printing an image of a picture frame of a film onto photographic paper.

Films from which prints are made tend to become scratched when transported in various photographic apparatus such as a camera, a developer, a negative film inspector, etc. These scratches usually extend in a lengthwise direction of the film and appear on prints as defects.

There are two well known types of photographic printers: diffusion type printers and condenser type printers. A typical diffusion type photographic printer which is widely utilized is shown in FIG. 5, and has a square shaped mirror box or tube 12, used as a diffuser, and disposed between a negative film 10 and a lamp 11. The mirror box 12 consists of an open ended mirror tube 20 with mirrored inner walls and diffusion plates 21 and 22 attached to the top and bottom of the mirror tube 20. Each diffusion plate 21, 22 is made of a matte glass plate or a milk white plastic plate. The negative film 10 is placed below and close to a framing mask 16 and is illuminated by the lamp 11. When a shutter 15 is opened, the light emanating from the lamp 11 enters the mirror box 12 and is diffused thereby. After passing through the negative film 10, the diffused light is focused on a photographic paper 14 placed over a framing mask 17 at an exposure station by means of a printing lens 13 to create a latent image of the negative film 10.

Diffusing the light from the lamp 11 prevents non-uniform distribution of light over the negative film 10 and contributes to providing high quality prints that are free from scratches on the negative film.

The diffused light passing through the mirror box 12 shows a substantially isotropic distribution, as shown in FIG. 5, but uses the light emanating from the lamp 11 inefficiently. To illuminate the negative film 10 with a sufficient amount of light, it was thought that the lamp 11 should be very bright. However, this causes a great amount of heat and increases the running cost of the photographic printer.

The condenser type photographic printer uses the light quite efficiently, but is disadvantageous in that scratches of the negative film will appear as defective images on prints.

SUMMARY OF THE INVENTION

Therefore, it is one object of the invention to provide a photographic printer which can use light very efficiently.

It is another object of the invention to provide a photographic printer which can provide high quality prints that are free from scratches on a negative film.

The foregoing and other objects of the invention are achieved by a photographic printer having an anisotropic diffuser disposed between a transparent original from which a print is made, and a light source for illuminating the transparent original. The anisotropic diffuser diffuses printing light only in one direction, perpendicular to a lengthwise direction in which the transparent film extends.

Because of the anisotropic diffusion of the printing light by the diffuser, scratches on films extending in the lengthwise direction will not appear on a print. Furthermore, because no printing light is diffused in the lengthwise direction of the film, the printing light is used very efficiently.

BRIEF DESCRIPTION OF THE DRAWINGS

The invention now will be described in detail with reference to a preferred embodiment shown in the drawings, in which.

DETAILED DESCRIPTION OF A PREFERRED EMBODIMENT

Figure 1:
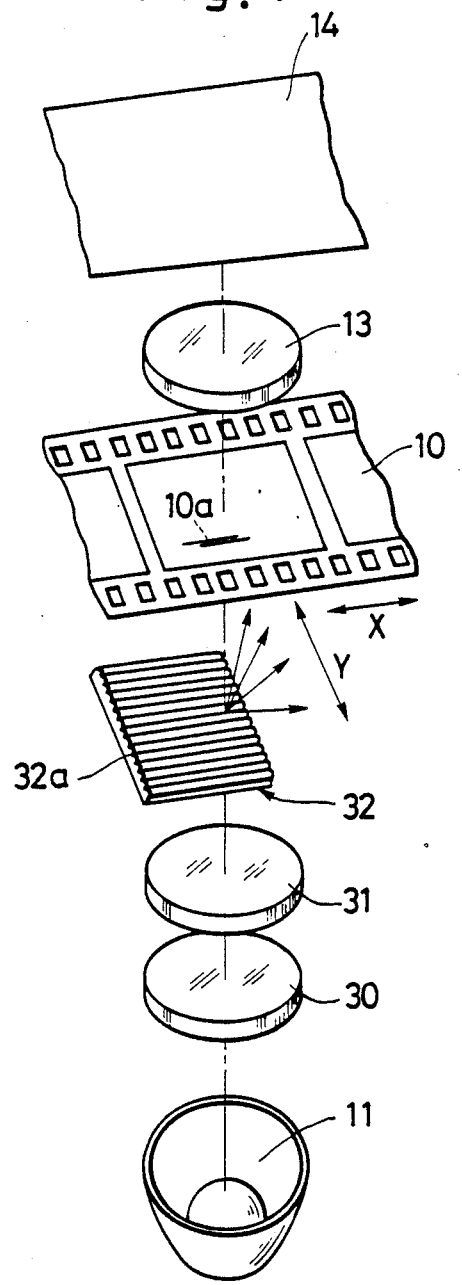
FIG. 1 is a schematic perspective illustration showing a printing optical system according to one preferred embodiment of the present invention.

FIG. 1 shows schematically a photographic printer according to a preferred embodiment of the invention. The printer has upper and lower condenser lenses 30 and 31 disposed above a lamp 11 put in a parabolic reflector 33 for collecting the light from the illumination lamp 11 with a high efficiency and a lenticular lens 32 disposed above the condenser lenses 30 and 31. After passing through the lenticular lens 32 and then a transparent original 10, such as a negative film or a positive film, the collected light is focused on a photographic paper 14 placed over a framing mask at an exposure station by means of a printing lens 13 to create a latent image of the transparent film 10.

Figure 2:
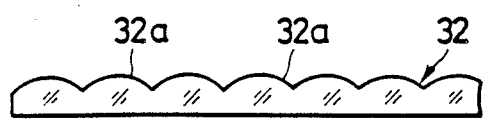
FIG. 2 is a cross sectional view showing a lenticular lens used in the printing optical system shown in FIG. 1.

The lenticular lens 32, shown in FIG. 2, has a regular array of a large number of cylindrical lenses 32a which are arranged at regular spacings along a first, or Y-direction, and extend parallel to each other along a second, X-direction that is perpendicular to a Y-direction. The spacings at which the cylindrical lenses are regularly arranged are sufficiently small relative to the size of the picture frame of the transparent film 10. The lenticular lens 32 passes light in the Y-direction in which the cylindrical lenses 32a are arranged but not in the X-direction perpendicular to the Y-direction, and so functions as an anisotropic diffusion plate. Thus, the lenticular lens 32 diffuses light passing therethrough in the Y-direction only. The transparent film 10 is placed so as to have its lengthwise direction coincide with the X-direction of the lenticular lens 32.

The light emanating from the lamp 11 is converged by the condenser lenses 30 and 31 and is diffused in the Y-direction by the lenticular lens 32. The diffused light is focused on the photographic paper 14 by means of the printing lens 13 to create a latent image of the transparent film 10 on the paper. Because the light passed through the lenticular lens 32 is diffused not in the X-direction but in the Y-direction that is perpendicular to the lengthwise direction of the transparent film 10, the light passing through a scratch 10a of the transparent film 10 which extends in the lengthwise direction is not focused on the photographic paper 14, creating no latent image of the scratch 10a on the photographic film 10. Furthermore, there is decreased loss of the light emanating from the lamp 11.

Figure 3:
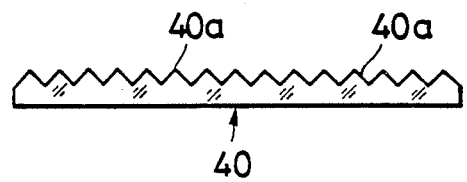
FIG. 3 is a cross sectional view showing a variant of the lenticular lens shown in FIG. 2.

The anisotropic lenticular lens 32 can be replaced with another form of an anisotropic lenticular lens 40, shown in FIG. 3. The anisotropic lenticular lens 40 has a regular array of a large number of stick-like lenses 40a having a triangular cross section and extending parallel to one another. The spacings at which the stick-like lenses 40a are regularly arranged are sufficiently small relative to the size of the picture frame of the transparent film 10. The anisotropic lenticular lens 40 has a power in a Y-direction in which the stick-like lenses 40a are arranged, but no power in an X-direction perpendicular to the Y-direction. The anisotropic lenticular lens 40 serves in substantially the same manner as the anisotropic diffusion lens 32 of the previous embodiment.

Figure 4:
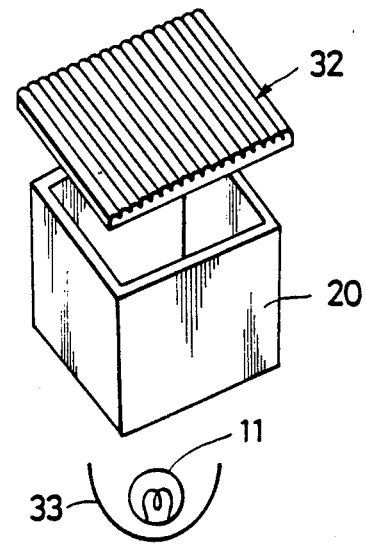
FIG. 4 is a schematic perspective illustration showing an essential part of a printing optical system according to another preferred embodiment of the present invention.
Figure 5:
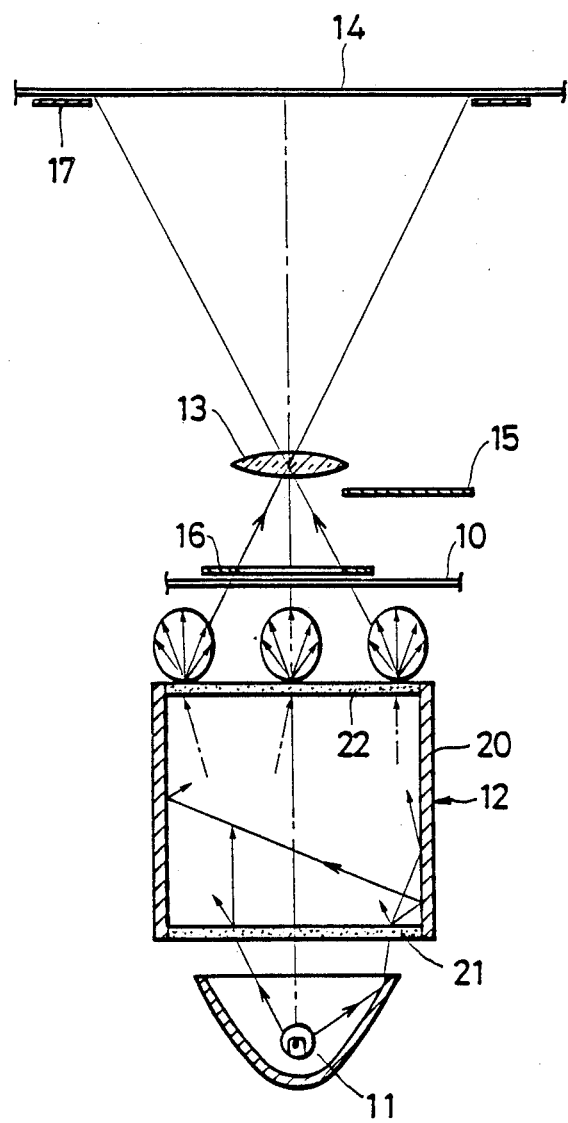
FIG. 5 is a schematic illustration of a conventional diffusion type printer.

The condenser lenses 30 and 31 can be replaced with the mirror box 20 as shown in FIG. 4. The mirror box 20 is disposed between the illumination lamp 11 and the anisotropic lenticular lens 32 shown in FIG. 2 or the anisotropic lenticular lens 40 shown in FIG. 3.

In the embodiments described above, it is not always necessary to use the condenser lenses 30 and 31 or the mirror box 20. To improve the uniformity of distribution of light, it is preferred to provide a light mixer between the lamp 11 and the lens 32 or 40. The lens 32 or 40 may be replaced with a transparent plate made of glass or plastic and having a regular array of a plurality of either protuberances or grooves which are arranged in the Y-direction at regular spacings and which extend parallel to one another in the X-direction.

Although the present invention has been fully described by way of a preferred embodiment thereof with reference to the accompanying drawings, various changes and modifications within the scope and spirit of the invention will be apparent to those skilled in the relevant technical field. Thus, the invention should be considered as limited only by the scope of the appended claims.

What is claimed is:

1. A photographic printer for making a print from a transparent original film, said film having a widthwise direction and a lengthwise direction and being disposed on said photographic printer along said lengthwise direction, said photographic printer comprising:
   a light source for illuminating said transparent original film;
   a printing lens for focusing light passing said transparent original film on a photographic paper to create a latent image of the transparent original film; and
   anisotropic diffusing means, disposed between said transparent original and said light source, for diffusing light substantially only in said widthwise direction.

2. A photographic printer as defined in claim 1, further comprising a condenser lens disposed between said light source and said anisotropic diffusing means.

3. A photographic printer as defined in claim 2, wherein said anisotropic diffusing means comprises a lenticular lens.

4. A photographic printer as defined in claim 1, further comprising an open ended mirror tube disposed between said light source and said anisotropic diffusing means.

5. A photographic printer as defined in claim 4, wherein said anisotropic diffusing means comprises a lenticular lens and attached to said open ended mirror tube.

6. A photographic printer as defined in claim 3, wherein said lenticular lens comprises a plurality of cylindrical lenses having a semicircular cross-section, said cylindrical lenses being disposed at regular intervals along said lengthwise direction and extending along said widthwise direction.

7. A photographic printer as defined in claim 3, wherein said lenticular lens comprises a plurality of stick-like lenses having a triangular cross-section, said stick-like lenses being disposed at regular intervals along said lengthwise direction and extending along said widthwise direction.

8. A method of photographic printing, comprising the following steps:
   arranging a transparent original film, having a lengthwise direction and a widthwise direction, along said lengthwise direction;
   arranging an anisotropic diffusing lens, having a plurality of lenses spaced regularly along said lengthwise direction and extending parallel to each other along said widthwise direction, between said transparent original film and a light source; and
   illuminating said light source so as to pass light through said anisotropic diffusing lens substantially only in said widthwise direction onto a photographic film.

9. A method as claimed in claim 8, wherein said anisotropic diffusing means comprises a lenticular lens.

10. A method as claimed in claim 9, wherein said lenticular lens comprises a plurality of cylindrical lenses having a semicircular cross-section, said cylindrical lenses being disposed at regular intervals along said lengthwise direction and extending along said widthwise direction.

11. A method as claimed in claim 9, wherein said lenticular lens comprises a plurality of stick like lenses having a triangular cross-section, said stick like lenses being disposed at regular intervals along said lengthwise direction and extending along said widthwise direction.

12. A method as claimed in claim 8, further comprising the step of arranging a condenser lens between said light source and said anisotropic diffusing means.

13. A method as claimed in claim 8, further comprising the step of arranging an open-ended mirror tube between said light source and said anisotropic diffusing means.

* * * * *